United States Patent [19]

Pavlovsky et al.

[11] 4,114,281
[45] Sep. 19, 1978

[54] METHOD OF AND DEVICE FOR CLAMPING A WORKPIECE

[75] Inventors: Rudolf Pavlovsky, Schaffhausen; Heinz Wüest, Sonnenberg, both of Switzerland

[73] Assignee: Georg Fischer Aktiengesellschaft, Schaffhausen, Switzerland

[21] Appl. No.: 771,948

[22] Filed: Feb. 25, 1977

[30] Foreign Application Priority Data

Mar. 2, 1976 [CH] Switzerland ............... 2600/76

[51] Int. Cl.² .................................................. G01B 5/00
[52] U.S. Cl. ................................ 33/180 R; 33/185 R; 269/71
[58] Field of Search ............... 33/180 R, 185 R, 174 P; 269/71, 316

[56] References Cited

U.S. PATENT DOCUMENTS

| 3,106,111 | 10/1963 | Denisco | 269/71 |
| 3,131,917 | 5/1964 | Gessner et al. | 269/71 |
| 3,840,994 | 10/1974 | Izumi et al. | 33/174 PC |
| 3,950,858 | 4/1976 | Donner et al. | 33/179.5 D |

*Primary Examiner*—Richard E. Aegerter
*Assistant Examiner*—Willis Little
*Attorney, Agent, or Firm*—Toren, McGeady and Stanger

[57] ABSTRACT

In a device for clamping a workpiece, such as an undressed casting, so that various surfaces of the workpiece can be mechanically worked, a platform having a support surface for the workpiece is pivotally mounted on a horizontal first axle located below the support surface. The first axle is pivotally mounted in a first cup-shaped housing which, in turn, is mounted for rotation about a vertically extending second axle. The first housing is pivotally supported within a second cup-shaped housing which is secured by swivel arms to a horizontal third axle located above and extending normally of the first axle. With the workpiece located on the support surface of the platform, the position of the surface to be worked is sensed to determine any deviations from a nominal position and by pivoting the platform about the three axles the surface can be precisely located for the working operation.

15 Claims, 9 Drawing Figures

METHOD OF AND DEVICE FOR CLAMPING A WORKPIECE

SUMMARY OF THE INVENTION

The present invention is directed to a method of and a device for locating a workpiece in position for treatment, particularly for the mechanical working of undressed castings.

Devices are known where stops or fixing pins locate the workpiece in an aligned position relative to a machining tool. One disadvantage of this arrangement is that different fixtures must be used for different forms of workpieces which results in high costs and long changeover times if a variety of different shapes of workpieces are involved. To remove burrs and other residues from a clamped casting by a machining operation, if possible, five sides of the workpiece should be accessible by the tool, however, it is rarely possible to do so when fixtures are used to hold the workpiece in place.

Furthermore, a device for clamping the workpiece is shown in DAS No. 2,032,775 for machining centers and transfer lines to provide accurate clamping of a workpiece by a holding frame where one or more workpieces are connected with the frame over thin material bridges. The clamping of the workpieces is effected by the holding frame which remains unchanged, even with different workpieces. Such a device is not suitable for deburring undressed castings, since complete deburring is not possible due to the required web-type material bridges located between the workpiece and the holding frame.

The primary object of the present invention is to provide a method of clamping different types of workpieces without any additional fixtures with the workpiece being automatically positioned in relation to a machining tool. The device which carries out the method affords accessibility to the workpiece by the machining tool so that the removal of runners and burrs from undressed castings can be accomplished with only one clamping operation.

In accordance with the present invention, the device for performing the method includes a platform arranged for rotation about a first axle extending parallel to the clamping or supporting surface of the platform. Further, the platform is arranged for rotation about a second axle extending perpendicularly to the first axle and about a third axle extending perpendicularly to the second axle. The drives for turning the axles are in operative connection with a measuring device including a sensor for checking the position of the workpiece.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
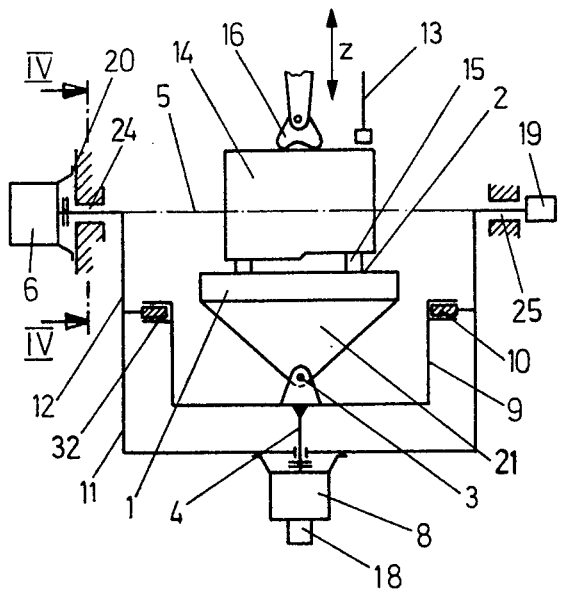
FIG. 1 is a cross sectional schematic view taken along the line I—I in FIG. 3 and illustrates the device for clamping a workpiece in an aligned position.
Figure 2:
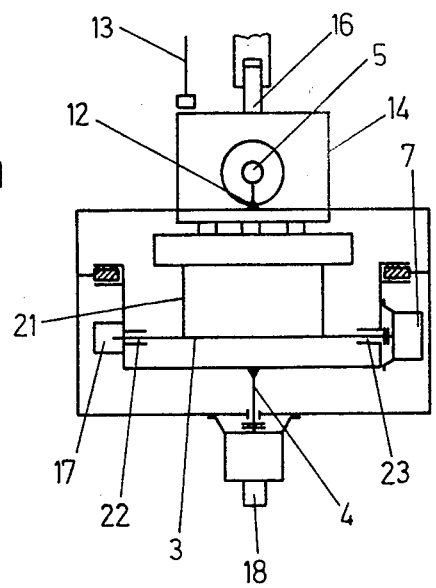
FIG. 2 is a schematic cross sectional view taken along the line II—II in FIG. 3.
Figure 3:
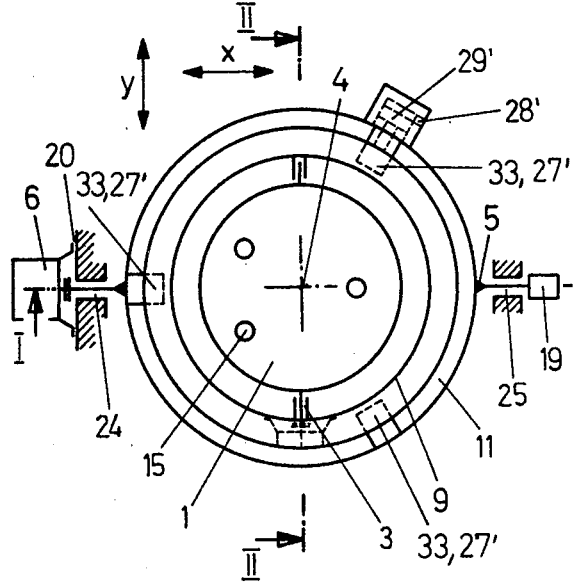
FIG. 3 is a schematic top view.

In FIGS. 1, 2 and 3 a device is illustrated for the aligned clamping of a workpiece shown schematically and the device includes a platform 1 mounted for rotation about three separate axles 3, 4 and 5. Platform 1 is rigidly connected by webs 21 with the first axle located below and in parallel with the horizontal clamping surface 2 of the platform. First axle 3 is pivotally mounted in bearings 22, 23 located in an inner cup-shaped housing 9. A rotational drive 7 is directly connected to the axle 3. Inner housing 9 is pivotally mounted by means of a ring-shaped bearing 10 located on the upper edge 32 of the housing for rotation about the second axle 4 which extends vertically below the housing. A rotational drive 8 is connected directly to the axle 4 and is supported on the lower surface of an outer cup-shaped housing 11.

Outer housing 11 laterally encloses the inner housing 9 and it is supported from the axle 5 by arms 12 located on opposite sides of the housing. The axle 5 is pivotally mounted in two bearings 24, 25 of a frame 20, not otherwise shown. The axles 3, 4 and 5 extend perpendicularly to one another, with axle 5 being disposed horizontally in the represented embodiment. It would also be possible to position the third axle 5 vertically. Rotational drive 6, mounted directly on the frame 20, drives the third axle 5. The rotational drives 6, 7 and 8 are preferably hydraulic rotary drives, however, other types of hydraulic or pneumatic drives can be used. Function generators 17, 18 and 19 are used to indicate the pivoted positions of the axles 3, 4 and 5.

Figure 5:
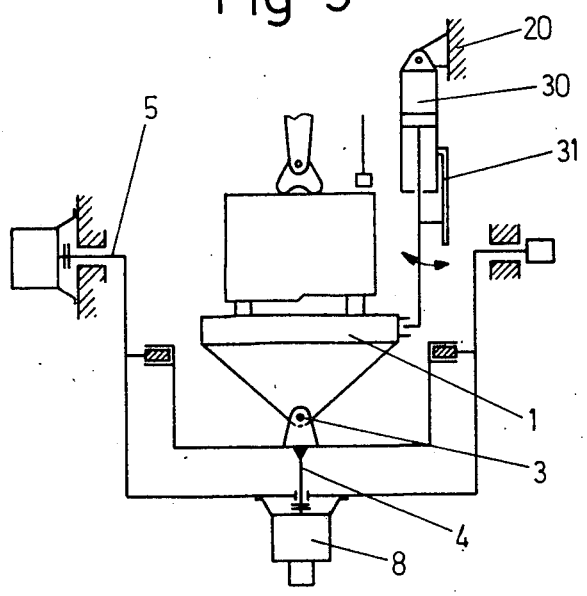
FIG. 5 is a schematic view of another embodiment of the device illustrated in FIG. 1.

In FIG. 5 another embodiment is shown of the rotational drive for the first axle 3. Platform 1 is connected eccentrically to a linear variable drive 30 for rotation about the axle 3. The drive, as shown, is a hydraulic cylinder pivotally mounted on frame 20 and operatively connected to a linear transmitter 31. By a pivotal movement of drive 30, its connection to the platform 1 can be released and the platform can be rotated into a vertical position by turning it about the third axle 5.

This variable drive can be used in another embodiment, not shown, with a vertically arranged platform 1 for its fine adjustment about the second axle 4, in addition to the use of the rotating drive 8 for coarse adjustment.

The bearings 22, 23, 24 and 25 and the ring-shaped bearing 10 are each designed as three point sliding bearings with adjustable play.

Figure 4:
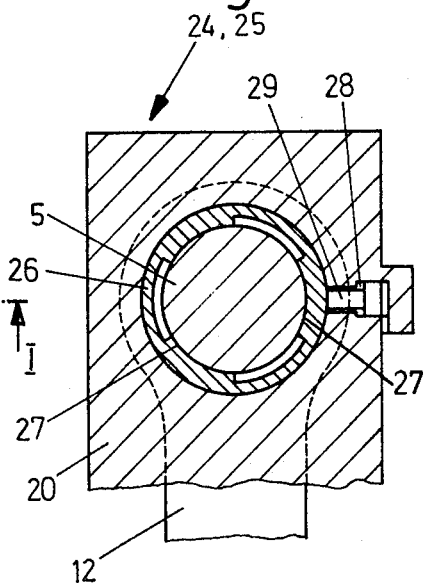
FIG. 4 is a partial sectional view taken along the line IV—IV in FIG. 1 and illustrated on an enlarged scale.

In FIG. 4 a cross section is shown through the bearings 24, 25, the other bearings have an identical design. Third axle 5 is rigidly connected with the arms 12 and each of the bearings includes a bearing bush 26 provided with three angularly spaced bearing surfaces 27 disposed 120° apart. The bearings are located in the frame 20. In the frame 20 at the location of the bearing bush 26 there is a cylinder 28 having a piston 29 which extends in the radial direction of one of the bearing surfaces 27 and extends into contact with the outer surface of the bearing bush 26. During pivotal movement of the axle, low hydraulic pressure is applied to the piston and it deforms the bearing bush 26 so that the axle can move free from play. During machining of the workpiece, it is necessary for the platform 1 to be clamped in the adjusted position. The clamping action is provided by admitting a higher hydraulic pressure to the piston for clamping the axle 5 in the bearing bush 26.

This same arrangement for rotating and clamping the axle 4 is used in bearings 22 and 23. As shown in FIG. 3, the ring-shaped bearing 10 for the inner housing 9 has a bearing surface 27' formed of three angularly spaced bearing parts 33 located on the outer housing 11. One of these bearing parts 33 can be moved by a piston 29' in a hydraulic cylinder 28' radially of the axle 4 for clamping the inner housing and also for adjusting play when the inner housing is rotated about the second axle.

For workpieces 14 having different bearing planes, the support surface on the platform 1 is provided with three supports 15. A clamping device represented in the drawing only by its clamping member 16 is located above the support surface of the platform 1 and holds the workpiece against the supports 15. If the workpieces have a flat bearing plane they can be placed directly on the support surface of the platform 1 and magnetic clamping can be used, since the surfaces to be machined could then be fully accessible.

The following is a description of the manner in which the device is operated for providing the aligned clamping of a workpiece.

Workpieces to be machined, preferably undressed castings whose various surface residues and burrs which remain after the riser has been knocked off and must be removed by machining, are placed individually on the supports 15 of the platform 1 and are held tightly by the clamping member 16 of the clamping device. Subsequently, the actual position of the workpiece surface to be machined is determined by one or more sensors 13 of a measuring device at at least two selected spaced points, and any deviation determined by the sensor from a nominal position is corrected by rotating the platform about the three axles 3, 4 and 5. If a sensor 13 is used, it must also be adjustable in the direction of the X and Y axis, in addition to the feeding direction of the Z axis, note FIGS. 1 and 3, so that the fixed measuring points can be reached.

Preferably, the sensors 13 are arranged with the machining tool, for example, on a displaceable cross slide with the feeding direction along the Z axis being effected by the adjusting elements used for the feeding movement of the machine tool. Several sensors positioned at the measuring points can also be used. Measurement of any deviations from a nominal position can be effected by non-contact sensors, preferably of the induction type, and several measuring methods can be utilized.

Figure 6:
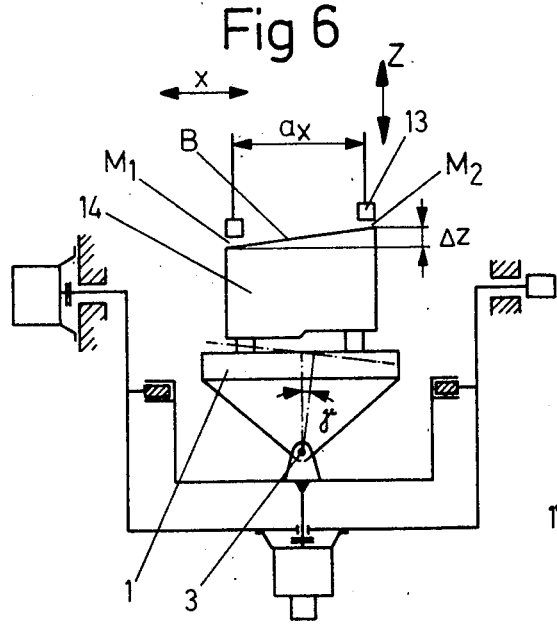
FIGS. 6 and 7 show a device similar to FIG. 1 with a horizontal support surface on a platform for use in aligning the upper surface of a workpiece.
Figure 7:
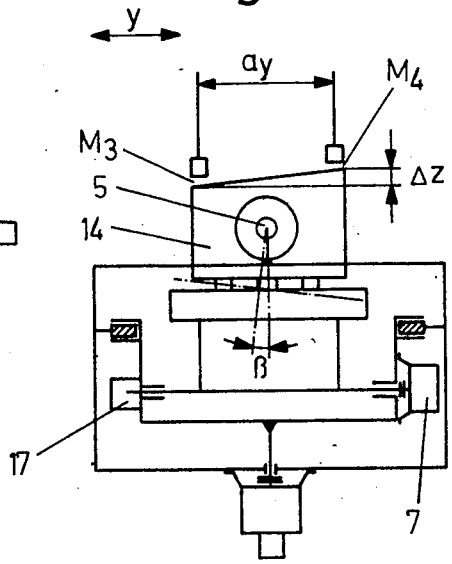

To machine the surface B of workpiece 14, note FIG. 6, it must be placed perpendicularly to the tool axis. As indicated in FIGS. 6 and 7, the positioning of surface B is effected first by scanning the measuring points $M_1$ and $M_2$ spaced apart in the X-direction. The measured differences in the direction of the Z-axis $(Z_1 - Z_2) = \Delta Z$ is converted by means of the measuring point distance $a_X$, in a computer into the angle $\delta$ for the movement about the first axle. The value established in the computer is transformed by means of an electric-hydraulic servo-control mechanism and the rotational drive 7 into a rotational movement of the first axle 3 and the extent of the rotational movement is checked by the function generator 17.

Subsequently, the measuring points $M_3$ and $M_4$, note FIG. 7, are scanned in the Y-axis direction and the position of the surface B is corrected according to the above described method by rotating platform 1 about the third axle through an angular distance corresponding to the extent of the correction, that is, by the angle $\beta$.

After positioning the surface B in the above manner, the deviation or distance of the workpiece surface from a fixed point on the Z-axis is checked by the sensor 13 and based on the determined distance any necessary adjustment can be made and the machining of the surface B carried out.

Figure 8:
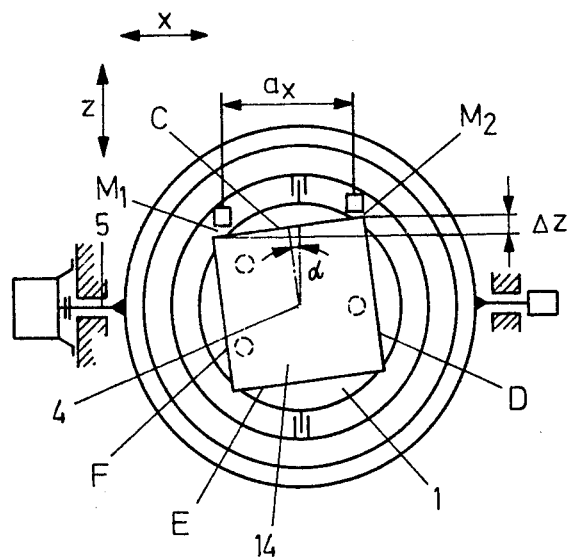
FIGS. 8 and 9 show a device similar to that shown in FIG. 1 but with a platform having a vertical support surface for aligning the peripheral sides of a workpiece in position.
Figure 9:
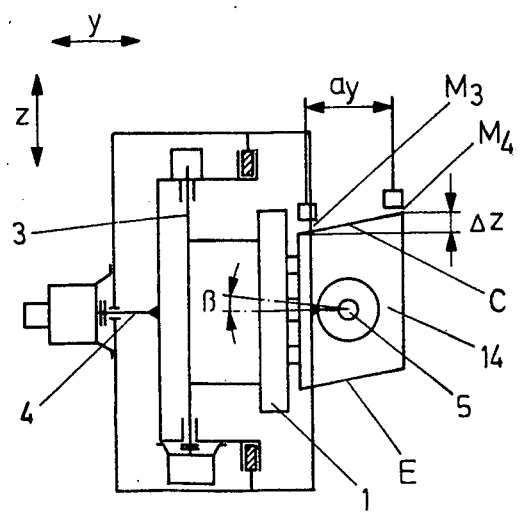

To machine the lateral sides C, D, E and F of workpiece 14, note FIGS. 8 and 9, the correction of the position of the surfaces is carried out with the platform 1 extending vertically, that is, its support surface is oriented in the vertical direction. To position the platform vertically, it is turned about the third axle 5 from the zero position to the 90° position. The positioning and following machining for each of the lateral sides is carried out separately, each of the sides being brought, in turn, into the position of surface C in FIG. 8 by rotating the platform about the second axle 4 through 90° for locating each of the sides in position to be machined. The actual position of each lateral side is measured, as described and as shown in FIGS. 8 and 9, first at the measuring points $M_1$ and $M_2$ along the X-axis with a subsequent position correction being made, if necessary, by rotating the platform 1 about the second axle 4 through an angle corresponding to the angle $\alpha$. Next, measurements are taken at the points $M_3$ and $M_4$ spaced apart along the Y-axis with any subsequent correction being made by turning the platform 1 about the third axle 5 an angular amount corresponding to the angle $\beta$.

To remove burrs and other surface projections or imperfections from the undressed casting by machining the above described method is sufficient in most cases for properly locating the surface of the workpiece to be machined.

To cut and grind contours, offsets and the like and to drill bores, requires, however, a complete position adjustment of the workpiece. Such an adjustment is effected, for example, with the platform 1 in the horizontal position and in addition to the above described positioning of the surface to be machined, perpendicularly to the axis of the machining tool, by turning the platform about the second or vertical axis 4 and displacing the platform in the direction of the X and Y axes which requires the arrangement of the device on a cross slide with corresponding variable drives and position indicators.

If the machining tool is positioned on a cross slide, the corrections or adjustments can also be effected in the transverse X and Y axes by displacing the tool in the direction corresponding to the measured differences between a nominal position and the actual position of the workpiece.

For determining the actual position of the workpiece or of the surface of the workpiece, at least two additional sensors must be arranged so that the workpiece can be scanned on two adjoining lateral sides in the direction of the X and Y axes. The angle $\alpha$ for the second axle 4 is, in this arrangement, determined by means of a computer from the differences in the measured values on one lateral side and the spaced distances of the measuring points.

By using the method and device according to the invention and described above, it is also possible to correct dimensional errors in the workpieces, such as caused by model defects, different shrinkage warping by annealment or the like, and also errors by inaccurate finishing machines. If the workpiece is not accurately positioned on the platform its position can be corrected using the method and device of the present invention.

Moreover, it is possible with this device to make only such adjustments as are needed for the respective working operation, accordingly, both time and costs can be saved. However, the device is still universally applicable, particularly for use with workpieces of different configurations.

While specific embodiments of the invention have been shown and described in detail to illustrate the application of the inventive principles, it will be understood that the invention may be embodied otherwise without departing from such principles.

What is claimed is:

1. Method of locating a workpiece in position to be worked, especially for the mechanical working of a workpiece in the form of a rough or undressed casting, comprising the steps of mounting a movably displaceable support surface for pivotal movement about three separate spaced axes, clamping the workpiece on the movably displaceable support surface, measuring the deviation of a surface on the workpiece from a nominal position in at least two spaced locations, and adjusting the support surface based on the measured deviations for eliminating the deviations of the surface on the workpiece from the nominal position by rotatably moving the support surface together with the clamped workpiece about at least one of its three separate spaced axes.

2. Method, as set forth in claim 1, comprising the step of measuring the deviation of the workpiece from a nominal position while maintaining the support surface in a horizontal position.

3. Method, as set forth in claim 1, comprising performing the step of measuring the deviation of a surface from a nominal position by taking the measurements with the support surface in the horizontal position and then taking the measurements with the support surface in the vertical position.

4. Method, as set forth in claim 1, comprising the step of measuring the deviation from the surface of the workpiece to the nominal position by non-contact measuring.

5. Method, as set forth in claim 1, comprising the step of arranging the three separate axes each perpendicular to the other, measuring the deviation of the surface of the workpiece from the nominal position along each of the three axes and adjusting the support surface about the three axes to eliminate any deviations from the nominal positions.

6. Device for securing a workpiece in position to be worked, especially for mechanical working a workpiece in the form of a rough or undressed casting, comprising a platform having a support surface thereon for holding a workpiece, clamping means for securing the workpiece on the support surface, a first axle pivotally mounting said platform with said first axle disposed in parallel relation with the support surface of said platform, a second axle pivotally mounting said platform and said second axle extending perpendicularly of said first axle, and a third axle pivotally mounting said platform and extending perpendicularly of said second axle, a drive operatively connected to each of said first, second and third axles, a measuring device including at least one sensor for measuring deviations between a surface on the workpiece and a nominal position and said drives for axles being operatively connected to said measuring device for correcting deviations of the surface on the workpiece from a nominal position.

7. Device, as set forth in claim 6, wherein said third axle is positioned horizontally.

8. Device, as set forth in claim 6, wherein said first axle is spaced from said supporting surface.

9. Device, as set forth in claim 7, wherein said supporting surface of said platform being positionable in a horizontal plane and in the horizontal plane said supporting surface is spaced below said third axle.

10. Device, as set forth in claim 6, comprising a first cup-shaped housing pivotally mounted for rotation about said second axle, said platform pivotally mounted in said first housing for rotation therewith about said second axle, a second cup-shaped housing, said first housing positioned in said second housing and having the peripheral circumferential edge movably supported on said second housing so that said edge moves relative to said second housing when said platform rotates about said second axle, and swivel arms secured to said third axle and supporting said second housing for rotation of said second housing about said third axle.

11. Device, as set forth in claim 6, wherein said drives comprise hydraulic rotary drives connected directly to said axles.

12. Device, as set forth in claim 6, wherein said drive for said first axle is a variable linear drive eccentrically connected to said platform.

13. Device, as set forth in claim 10, wherein a diffferent three-point sliding bearing rotatably mounts each of said platform, said first cup-shaped housing and said swivel arms, each said sliding bearing having adjustable play and a means operatively connected to each said sliding bearing for clamping said axle in said sliding bearing.

14. Device, as set forth in claim 13, wherein said clamping means for said sliding bearings comprises a hydraulic piston having a low pressure setting and a high pressure setting, and said hydraulic pressure piston being displaceable against said sliding bearing so that in the low pressure setting said piston adjusts the play in the associated said sliding bearing and in said high pressured setting said piston clamps said axle in the associated said sliding bearing.

15. Device, as set forth in claim 6, wherein with the support surface of said platform located in a horizontal plane, said first axle extends horizontally, said second axle extends vertically and is located below said first axle and the projection of said second axle intersects said first axle, and said third axle extending horizontally and located above the support surface of said platform with said third axle extending normally to said first axle.

* * * * *